R. DUTTON.

Mower.

2 Sheets—Sheet 1.

No. 41,460.

Patented Feb. 2, 1864.

Witnesses:

Inventor:

R. DUTTON.
Mower.
No. 41,460.
2 Sheets—Sheet 2.
Patented Feb. 2, 1864.
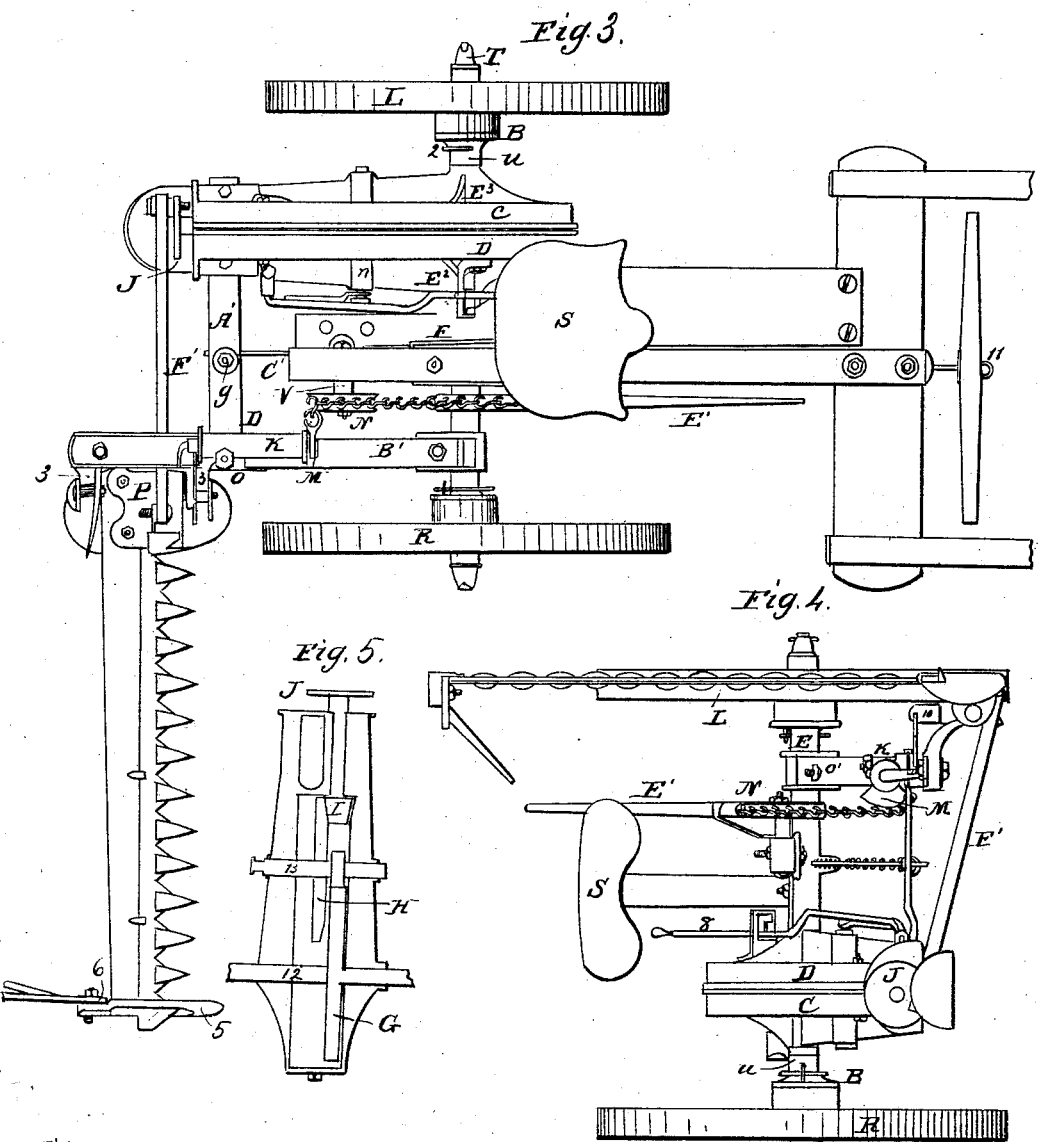

UNITED STATES PATENT OFFICE.

RUFUS DUTTON, OF BROOKLYN, ASSIGNOR TO HIMSELF AND ANTHONY B. ALLEN, OF NEW YORK, N. Y.

IMPROVEMENT IN MOWING-MACHINES.

Specification forming part of Letters Patent No. 41,460, dated February 2, 1864.

*To all whom it may concern:*

Be it known that I, RUFUS DUTTON, of the city of Brooklyn, and State of New York, have invented a new and Improved Construction of a Mowing-Machine; and I hereby declare that the following is a full and sufficient description thereof, reference being had to the accompanying drawings, making a part of this specification, in which—

Figure 1:
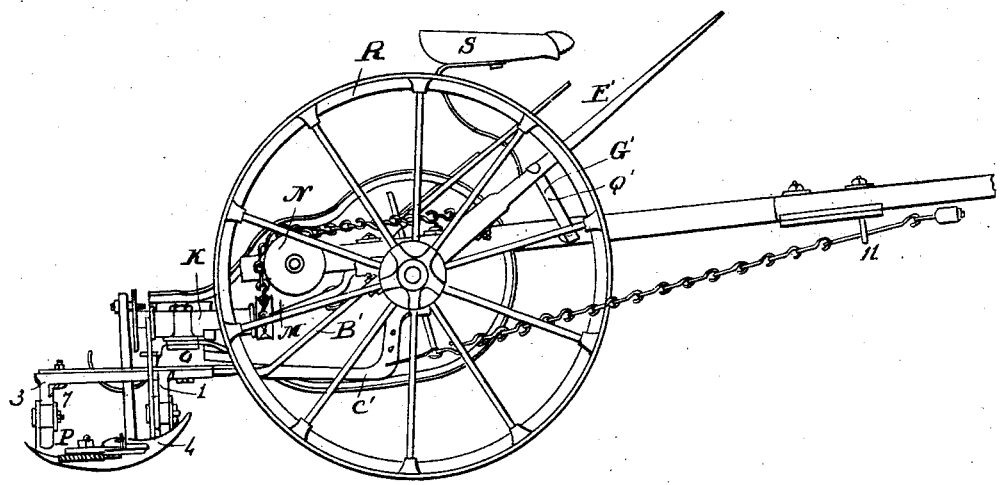
Figure 2:
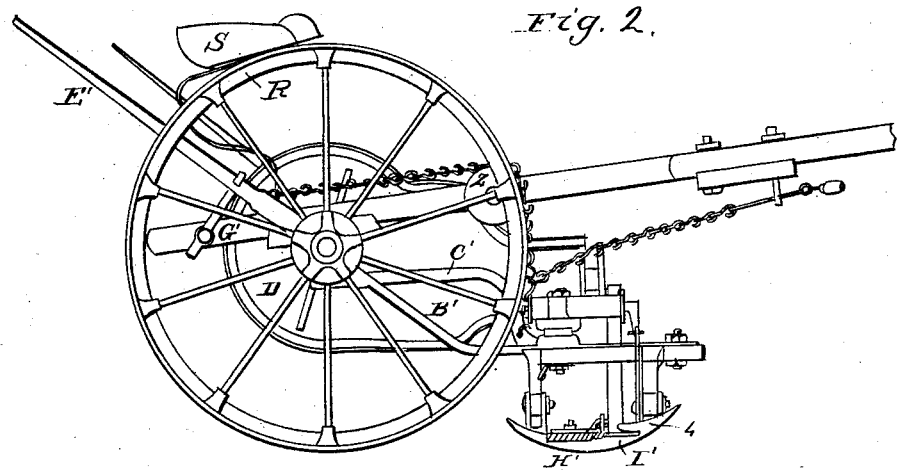

Figure 1 is a longitudinal elevation taken from the right side of the machine, the cutters being behind the wheels; Fig. 2, a longitunal elevation, the cutters being before the wheels; Fig. 3, a top view, the cutters being behind the wheels; Fig. 4, a rear end view as seen from the ground; Fig. 5, a section showing the arrangement of the gearing for transmitting motion to the cutting apparatus.

The present machine is specially adapted to mowing grass. The cutters are placed, in two-wheeled mowing-machines as ordinarily constructed, at the side, and in front or rear of the driving-wheels, when it is called a "front" or a "rear" cutting machine. Each position has its advantages, depending on the kind of grass to be cut, as well as on the kind of ground traversed.

To combine the advantage of each class of machines I have so constructed the present machine that the cutters may be transferred from the front to the rear of the wheels, and vice versa.

My invention in the present case is restricted to certain specific features hereinafter described in detail.

The first of the devices referred to consists of an arrangement of bevel and spur gearing having all its journal-bearings in a single plate of metal. This gearing, having also separate and independent functions, has been elsewhere described and claimed in a separate application.

Another device consists in the arrangement and combination of a hook for holding the finger-bar in a certain position adapted to taking the machine through gates or bars, but this feature is not claimed.

Another device consists in the use of a certain double-armed rock-shaft for elevating and depressing the cutters.

In the accompanying drawings the same reference letters or numbers refer to the corresponding parts in all the drawings.

In the drawings, let R represent the right and L the left wheel; C, the plain side of the gear-casing. D is the shifter side of the gear-casing; B, the pawl-flange next the inner hub of the left wheel; B′, the brace-bar, acting as the side piece of the frame, on the right side of the machine, and extending from the axle to the shoe. A is the pawl-flange next the inner hub of the right wheel; E, the brace-hub; G, the spur-gearing; H, spur-pinion and bevel-gear; E′, hoist-lever; I, bevel-pinion; F, the pole-clamp; J, the crank-wheel connecting the driving-gear to the cutting apparatus; F′, the connecting-rod; K, lifter sleeve, used in operating the double-armed rock-shaft; M, the lifter segment, constituting the forward and inner arm of the rock-shaft. N is the lifter-sheave. O is the clamp of the brace-bar; 3 3, double connecting knee-piece, on which vibrates the finger-bar. 4 is the inside shoe. 5 is the outside shoe. 6 is the track-board cap; 7, the shoe-hook or automatic stop apparatus. P is the heel-clamp; S, driver's seat; T, wheel-washers; U, the casing-collar; V, sheave-hub sustaining the chain for elevating the cutters. Q is the forward clamp-nut of brace-bar B′. 9 represents draft-iron jaws on the under side of the cross-bar; 10, the inside shoe-lever; 11, draft-rod eyebolt on the under side of the pole; A′, the cross-bar; C′, the draft rod or iron extending from the cross-piece to the axle. D′ is the lifter-crank for raising the cutting apparatus into the folded position. G′ is a hook for sustaining the hoist-lever.

The machine being arranged on two wheels, so that the cutting apparatus, which is on the side, may be moved from the rear to the front of a line coinciding with the line of the axle when extended, and from the front to the rear of said line, it was necessary to have the gear-casing so constructed as to be moved from the one to the other position. In constructing said gearing it was not only necessary to have it transferable from its position, but so mounted in the casing that it cannot get out of line under any circumstances. To accomplish this end the bearings of the several shafts in the gear-casing, as seen in Fig. 5, rest on either side in a single piece of metal. This device, when properly flanged and bolted together, constitutes a series of bearings that are not liable to be moved out of place.

It is not designed to claim the boxing in of gearing, that being a well-known device; but in all such boxing in of gearing known to this inventor the box is held in a single fixed position, not made movable or transferable, and is, moreover, bolted fast to the frame of the machine. This gearing, however, is movable and transferable from one position to another, and would be greatly liable to derangement but for the device of putting the several bearings on a single piece of metal, and that metal constituting the side or face of the casing. It is this double function of casing and journal-bearings that renders the device a valuable part of the invention. It matters not whether these sides be put together with vertical or horizontal joints. In the former case one end of the journal rests in the plain side of the casing C, while the other end of the several journals rests in the shifter side D. In the latter case the face of the two halves of the casing, horizontal with regard to position and longitudinal with regard to the length of the casing, is so constructed that bearings of all the journals at each end are in the lower half of the casing, and that lower half is in a single piece of metal. I have used this position of the faces of the joint, but prefer that represented in the drawings; but whether the faces of the joint be horizontal or vertical the journal-bearings rest in a single piece of metal, and because they so rest they cannot be readily put out of line by any wrenching or twisting action to which they may be exposed. The two halves of the casing may be locked together by projections and recesses fastened by bolts and nuts. In machines with wooden or even iron frames, where the journal-boxes are in separate pieces, depending on screws and bolts in wood, the parts are liable to get loose in working the machine and get "out of line," increasing friction and wear, with temporary or permanent injury. No known machinery is more exposed to strains of all kinds than mowing and reaping machines, which have to travel over rough ground and through heavy and tangled grass; hence the device is a positive and important improvement.

Another feature of my invention consists in the arrangement and combination of the automatic stop with the hook 7 for sustaining the finger-bar in the folded position. This device, called the "automatic stop apparatus," consists of a spring-hook, or a drop-hook or latch, projecting out horizontally from the rear part of the clamp-piece O and just in front of the rear knee piece, 3. A small mortise, a, or slot, of sufficient size to receive the hook, is made in the rear part of the inner shoe and just behind the finger-bar H'. The stop apparatus is designed to hold the finger-bar in the folded position during traveling to and from the field, or from one part of the field to another, and through gates or bars. The finger-bar is raised into the folded position by hand.

Another feature of my invention consists in the arrangement of the doubled-armed rock-shaft for elevating the finger-bar to pass over obstructions, the same being vibrated on its shaft within a sleeve, which sleeve acts as a substitute for journal-bearings. The sleeve has its outer end attached by a link to the short lever 10, on the inner shoe, while to the inner end crank or segment, M, there is a chain, Q, attached, passing over the lifter-sheave. In raising the finger-bar the outer end is lifted first, and it will often be found unnecessary to lift the inner end, except when it is done to move the machine to a distance. If the chain were attached to the crank at the outer end, the weight of the finger-bar would keep the outer shoe to the ground, while the heel would be lifted first; but being attached to the inner end of the lever crank, and nearer to the main axle, it forms the center of motion around which the heel of the finger-bar is lifted from the ground. A greater force is exerted to lift the outer end of the finger-bar than the inner end and frame.

There is another advantage in making the inner end of sleeve K the point of attachment for the chain, as the brace-bar B' may be considered as a lever to which the chain is attached by the inner crank at a point near its center, so that by raising the chain over the lifter-sheave a short distance the outer end of the lever, to which the finger-bar is attached, is raised to nearly double that distance. By the arrangement of the driver's seat he is enabled to raise the shoe higher from the ground than he could if the chain were attached to a point at or near the bar. To sum up the value or advantage of this feature of the improvement, it consists in lengthening the shaft and sleeve of the rock-shaft and extending it back toward the axle-tree, and about half the distance thereto, for the purpose of attaching the chain to the inner end of the rock-shaft at segment M, and thus throw the finger-bar and frame higher up than could be done by the same sweep of lever E' if the chain were attached to the outer end of the rock-shaft.

Having now described the nature of the invention and the manner of using the same, what I claim as my invention, and desire to secure by Letters Patent, is—

1. The arrangement and combination of the gearing with the side plates of the casing inclosing the said gearing and constituting journal-bearings therefor, when such plates are made in a single piece of metal, substantially as set forth.

2. The arrangement and combination of the double-armed rock-shaft operating in a sleeve, with the short lever 10 and the intervening link for lifting the finger-bar, substantially in the manner and for the purpose herein set forth.

RUFUS DUTTON.

Witnesses:
R. D. BUSH,
ALBERT Q. CHASE.